US007090737B2

(12) United States Patent
Lindenau

(10) Patent No.: US 7,090,737 B2
(45) Date of Patent: Aug. 15, 2006

(54) COMPONENT CONSISTING OF A FIBER-REINFORCED SYNTHETIC MATERIAL AND A METHOD FOR PRODUCING SAME

(75) Inventor: Emil Lindenau, Gals (CH)

(73) Assignee: Proteus GmbH, Gams (CH)

( * ) Notice: Subject to any disclaimer, the term of this patent is extended or adjusted under 35 U.S.C. 154(b) by 333 days.

(21) Appl. No.: 10/231,238

(22) Filed: Aug. 30, 2002

(65) Prior Publication Data
US 2003/0010424 A1    Jan. 16, 2003

Related U.S. Application Data

(63) Continuation of application No. PCT/CH01/00077, filed on Feb. 5, 2001, now abandoned.

(30) Foreign Application Priority Data
Mar. 3, 2000    (CH)    ................................ 0413/00

(51) Int. Cl.
*B29C 53/56* (2006.01)
*B65H 81/00* (2006.01)
(52) U.S. Cl. ................ 156/173; 156/169; 156/175
(58) Field of Classification Search ................ 156/169, 156/172, 173, 175
See application file for complete search history.

(56) References Cited

U.S. PATENT DOCUMENTS

| 4,376,669 | A | * | 3/1983 | Math | ........................ | 156/169 |
| 4,671,336 | A | * | 6/1987 | Anahara et al. | .......... | 74/579 R |
| 5,316,709 | A | * | 5/1994 | Ko et al. | .................... | 156/172 |
| 5,435,869 | A | * | 7/1995 | Christensen | ................ | 156/175 |
| 5,578,154 | A | * | 11/1996 | Britten | ....................... | 156/172 |
| 5,632,940 | A | * | 5/1997 | Whatley | ..................... | 156/173 |

FOREIGN PATENT DOCUMENTS

| EP | 0009403 A1 | * | 4/1980 |
| GB | 2004835 A | * | 4/1979 |
| GB | 2049613 A | * | 12/1980 |

* cited by examiner

*Primary Examiner*—Jeff H. Aftergut
(74) *Attorney, Agent, or Firm*—Buchanan Ingersoll PC

(57) ABSTRACT

The present invention is directed to components of fiber-reinforced plastics which can also be used as load-bearing components in mechanical and automotive engineering. A construction for such components is created that can be used flexibly and enables a defined design of the components. A method is created for this purpose that makes it possible to design and produce such load-bearing components to specific requirements. The method can be automatable and can make highly replicable results possible. The components thus produced of a fiber-reinforced plastic can have low weight with high strength properties and can be economical to produce.

11 Claims, 5 Drawing Sheets

Figure 1:
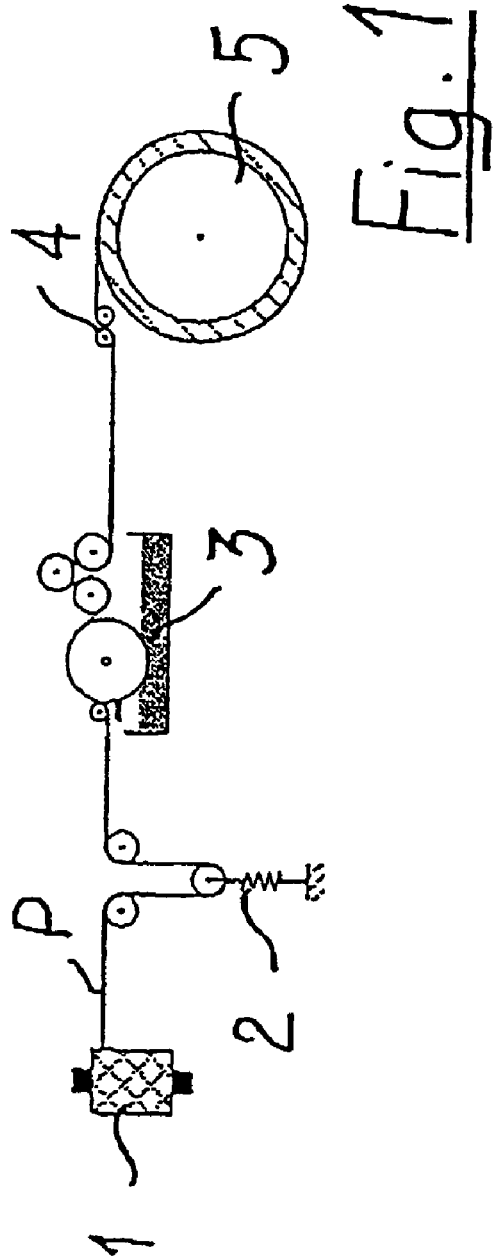

COMPONENT CONSISTING OF A FIBER-REINFORCED SYNTHETIC MATERIAL AND A METHOD FOR PRODUCING SAME

CROSS-REFERENCE TO RELATED APPLICATIONS

This application is a continuation application of PCT/CH01/00077 filed Feb. 5, 2001, now abandoned, which claims priority to Swiss Application No. 2000 0413/00 filed Mar. 3, 2000, both of which are incorporated herein by reference.

BACKGROUND

1. Field of the Invention

The invention relates to a component comprising fiber-reinforced plastic. The invention also relates to a method for producing a component, such as a bearer or a wheel rim, wound from fiber-reinforced plastic.

2. Background Information

Fiber-reinforced plastics are increasingly used to produce components of lightweight construction. Given the progress made in developing materials in the field of plastics and fiber materials and given the low weight of the components, these components are used above all in automotive engineering for making body parts and in railroad cars for constructing passenger compartments, but are also used in aircraft construction. Depending on the type of component, laminating techniques, injection molding processes (resin transfer molding) or fiber winding processes are used to produce the components.

The fiber winding process was one of the first production methods developed for processing composites. The advantage of this method is that the fibers are wound onto a mold core in a continuous process. In it, the fibers are often saturated with a resin and wet-impregnated in the same operation. The fiber winding process is distinguished by a high quality of lamination and high precision in terms of the fiber resin content and in the fiber orientation, with at the same time a high degree of automation and great economy. The fiber winding process is used to produce not only special components, such as cover caps for rotors and the like, but also to produce cover layers, which in the case of passenger compartments are wound around a large, rectangular, hollow hard foam core.

For producing load-bearing components, such as bearers in mechanical and automotive engineering, despite the familiar advantages of composites, conventional materials such as steel, aluminum or titanium are still primarily used. These materials are cast, pressed into molds, or machined out of solid blocks. Such components made of thermoplastics are also known, but once again these are either cast or pressed into molds.

The known materials for producing load-bearing components all have either high weight or are complicated and expensive to produce and process. The use of plastic composite materials in producing vehicles of lightweight construction has not yet produced the desired results. Especially in terms of crash performance, the known plastic constructions produce only inadequate results, and therefore for crash-related load-bearing components they are generally supplemented with comparatively heavy metal constructions.

SUMMARY OF THE INVENTION

The object of the present invention is to overcome these disadvantages of the prior art. Components of fiber-reinforced plastics are to be created which in particular can also be used as load-bearing components in mechanical and automotive engineering. A construction for such components is to be created that can be used flexibly and enables a defined design of the components. A method is to be created for this purpose that makes it possible to design and produce such load-bearing components to specific requirements. The method should be automatable and should make highly replicable results possible. The components thus produced of a fiber reinforced plastic should have low weight with high strength properties and should be economical to produce.

BACKGROUND OF THE INVENTION

Figure 2:
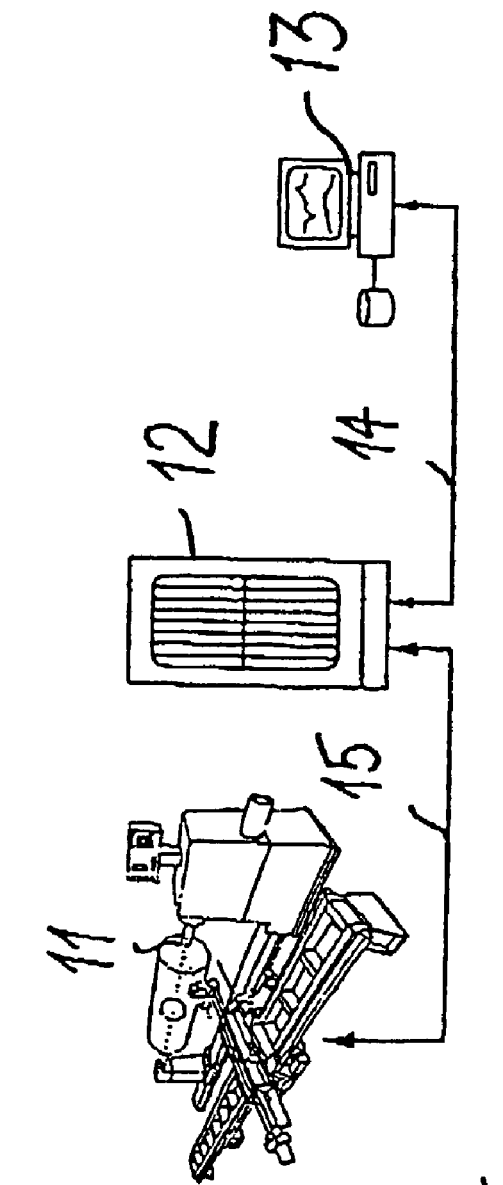
Figure 3:
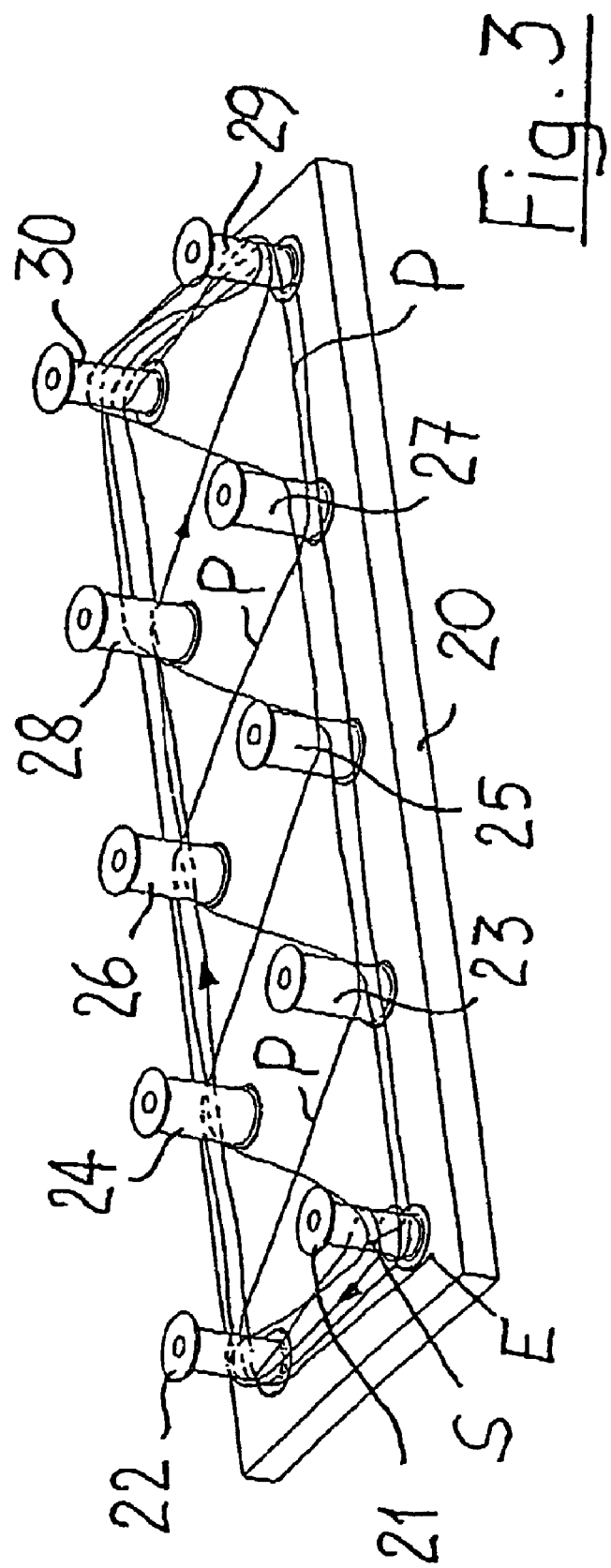
Figure 4:
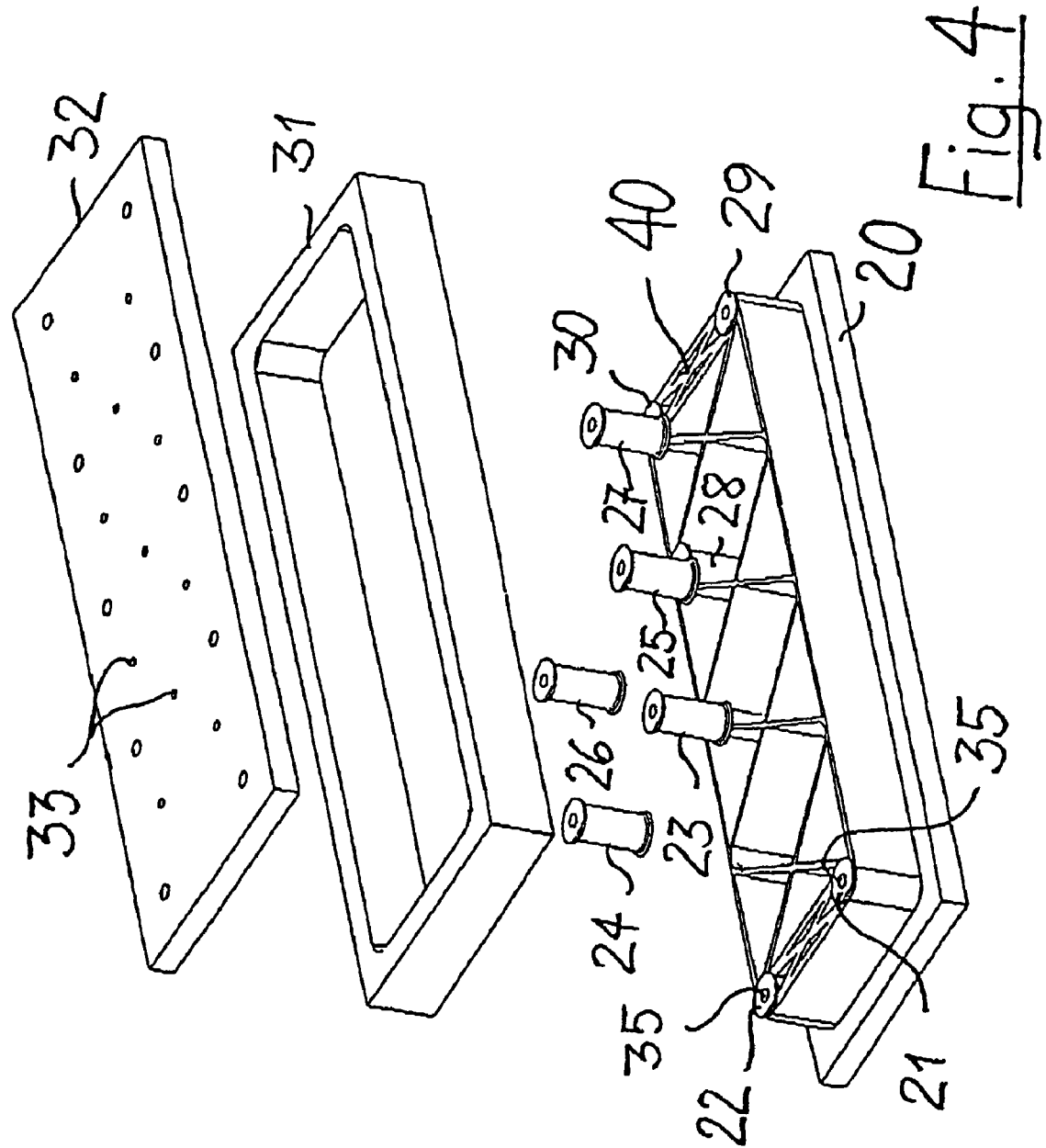
Figure 5:
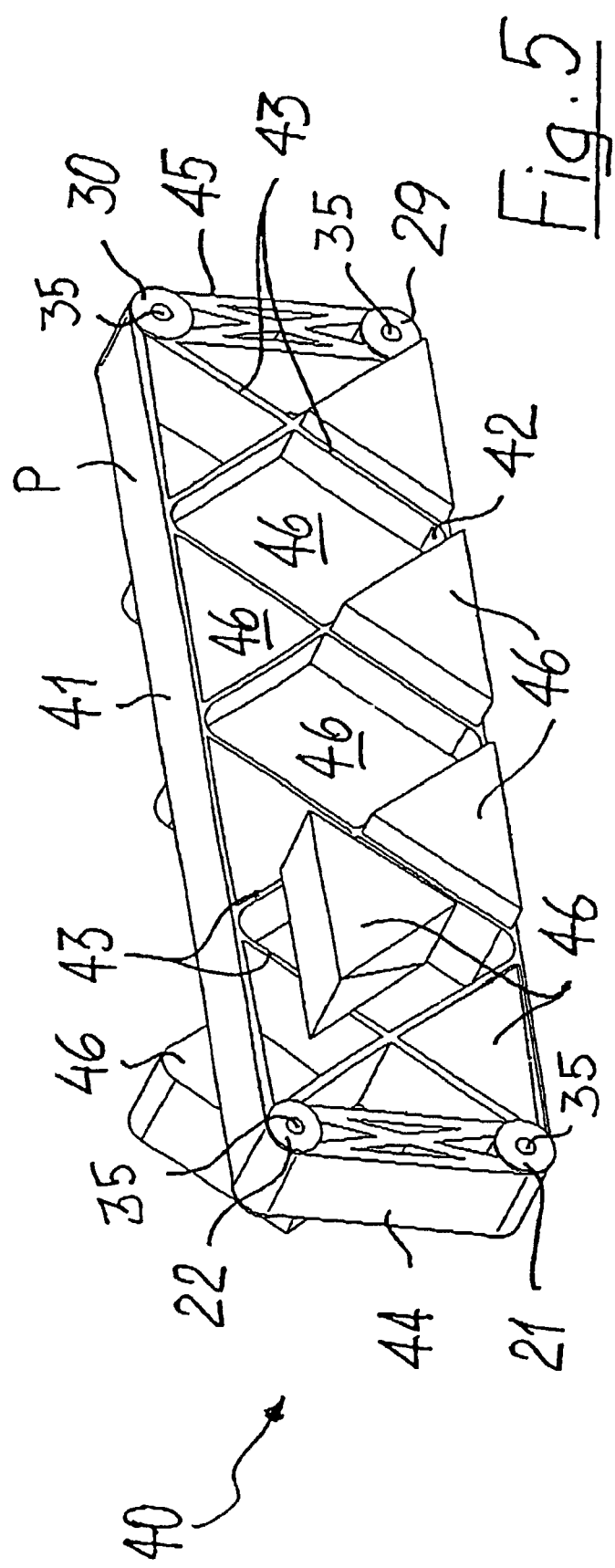

The invention will be described in further detail below in conjunction with the drawings. The drawings, not to scale, show the following:

FIG. 1, a schematic basic illustration of an exemplary winding method;

FIG. 2, a schematic illustration of the components of an exemplary winding system;

FIG. 3, a basic construction of one example of a wound component with a suggested winding course;

FIG. 4, a partly exploded view of an exemplary wound component, with elements for performing the production method;

FIG. 5, an exemplary embodiment of an unmolded component; and

Figure 6:
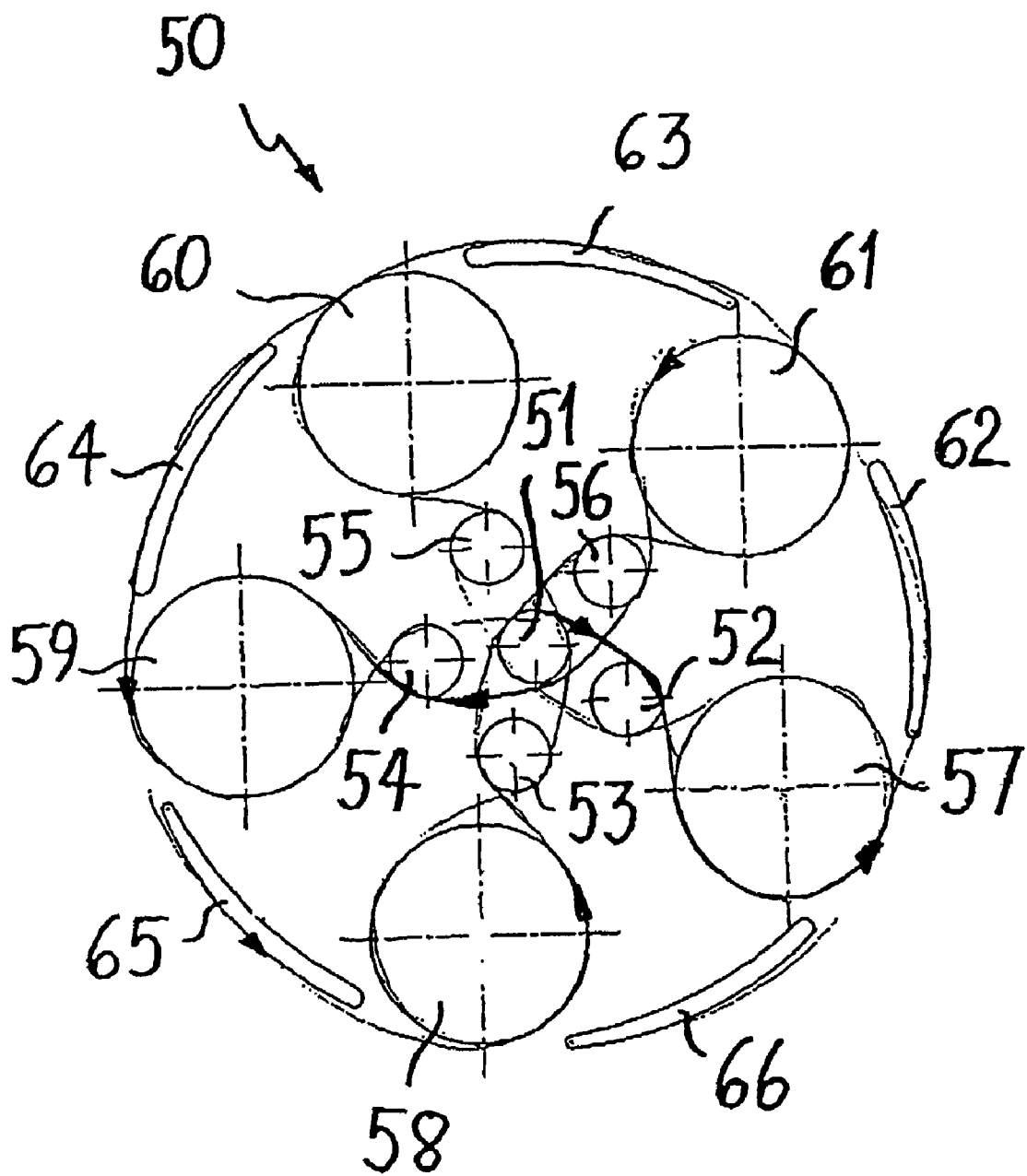

FIG. 6, an exemplary embodiment of a rotationally symmetrical wound component with a suggested winding course.

DETAILED DESCRIPTION OF THE PREFERRED EMBODIMENT

In a component of fiber-reinforced plastic, a synthetic-resin-impregnated semi-finished fiber product is wound, preferably in multiple layers, with preferably directional fibers about a winding core. The component is embodied as a load-bearing element and includes wound outer belt elements, which are joined to one another by means of an intermediate structure wound in trelliswork-like fashion. The voids between the outer belt elements and the intermediate structure are filled at least in some regions with a filler material.

Because the load-bearing component is embodied according to the invention, it is relatively simple to design. In contrast to the previous components that were cast or pressed into molds, the bearer structure wound in trelliswork-like fashion offers the capability of calculating the load-bearing performance. In practice, the process is the reverse, in which the requisite structure, winding course and winding density are defined on the basis of an expected or predetermined load. The trelliswork-like component is then produced by the well-known fiber winding process, on the basis of the values ascertained. The voids between the outer belt elements and the intermediate structure are filled at least in some regions with a filler material. The filler material supports the pressure-loaded portions of the trelliswork-like intermediate structure and prevents uncontrolled buckling if the load for which they are designed is exceeded.

The load-bearing components produced in this way have a decisive weight advantage over steel bearers, for instance, and are also still lighter than aluminum bearers by a factor of, for example, 1.5 to 2. The bearer wound from a preferably directional semi-finished fiber product has a tensile strength greater by a factor of, for example, 1.5 to 2 than a high-strength steel bearer. If the component is used as a bearer in a vehicle chassis, the filler material in the voids of the component serves as an energy absorber in the event of a crash. As filler materials, physically or chemically foamed plastics can be considered that have a temperature resistance that meets the requirements and/or have low flammability. Alternatively or in combination with the plastic foams, a metal or ceramic foam can also be used as the filler material.

The components wound from fiber-reinforced plastic have the advantage of being usable in all kinds of weather and can therefore be used through the entire year without limitations. To assure their use under extremely adverse environmental factors of physical or chemical origin, the wound bearing structure can be conventionally spray-coated. As a result, surface protection can be combined with class-A surface quality in the simplest possible way. The temperature resistance of the plastic used can be designed in accordance with the field of use. For reasons of economy, a temperature resistance up to, for example, approximately 180 C. appears adequate. The load-bearing components according to the invention are suitable for instance for use as bearers or reinforcing elements in vehicles of lightweight construction, for instance in the category up to approximately 800 kg. In this category, in the event of a crash, vehicles with a mass ratio of, for example, approximately 1:2 to approximately 1:3 can be expected to be involved. Such vehicles are mostly driven close to home and are thus exposed to an increased risk of a crash. The weight reduction that can be attained by using load-bearing components of the invention as chassis components proves to be especially favorable in terms of energy, especially in the field of use indicated. However, the load-bearing components of the invention are not limited to that particular use. The relatively simple construction and the definability of their strength properties also allows them to be used as bearers in trucks or in general in transport vehicles without further restrictions. The load-bearing components of fiber-reinforced plastic are advantageous for environmental reasons as well. After the end of their useful life, for instance, in the case of a vehicle, they can simply be further processed into granulate, which can then be used as filler in other applications, for instance. They are also relatively unproblematic to dispose of, since the entire construction contains no environmentally hazardous materials whatever.

To improve the load-bearing capacity of the component, this component is additionally compacted as well. This is done for instance automatically, with the wound components filled with foamable filler material, during the drying and foaming of the filler material inside a closed mold. For instance, the winding core is heated for this purpose. The foaming reaction is tripped, which in the closed mold can generate a relatively high pressure, which causes the compacting of the component.

In an advantageous variant of the invention, the outer belt elements and the trelliswork-like intermediate structure are wound integrally from a quasi-endless semi-finished fiber product. While it is in principle possible to wind both the outer belt elements and the intermediate structure separately and then join them together, for instance gluing them to one another, nevertheless for production reasons it is advantageous to produce the elements integrally in one work step.

The semi-finished fiber product, which is available in practically endless form, can be wound onto the winding core in a predetermined sequence. In this way, the outer belt elements and the intermediate structure are all produced in the same operation. Retroactively joining the elements is unnecessary, since after all they have been made integrally with one another and are practically in the form of a single component. The integral production has a definitive influence on the rigidity of the component.

An exemplary method used for producing the component of the invention is a fiber winding process, in particular a wet fiber winding process. For the strength of the component, it proves to be advantageous if the semi-finished fiber product is in the form of a synthetic-resin-impregnated roving, for example, approximately 1.5 mm to approximately 4 mm and preferably approximately 2.5 mm thick.

The semi-finished fiber product need not necessarily contain only a single type of fiber. For reasons of strength, it can be advantageous if the semi-finished fiber product includes a combination of different kinds of fiber structures, such as carbon, aramide or glass fibers, with preferably identically oriented fibers.

The resin matrix of the fiber-reinforced plastic can be on a pressure-setting or thermoplastic basis. The decision as to which kind to use depends on the demands made of the component in terms of quality and quantity.

The winding core for producing the load-bearing component of the invention includes a number of winding spools, which for the winding process are mounted detachably on a winding plate. The winding spools can be in the form of disposable parts, or they can be removed after the wound component has been completed and can be re-used to produce further components.

It proves to be advantageous if individual ones of the winding spools are embodied as disposable parts, in particular inserts. The inserts are equipped with connection devices, for instance threaded bores, for connecting further components.

For the strength of the component wound from a fiber-reinforced plastic, it is advantageous if the synthetic-resin-impregnated semi-finished fiber product, before the fiber is diverted, is guided unidirectionally for as long as possible. In the component of the invention, the windings of the synthetic-resin-impregnated semi-finish fiber product are therefore always guided in the trelliswork-like intermediate structure over at least two adjacent winding spools, before it changes its winding direction.

For the fiber winding process, various types of winding processes are known. For instance, cross-winding is known, in which the fiber rovings are wound crosswise onto a winding core. In the polar winding technique, the rovings are each wound over the poles of a winding core. These techniques are employed in particular in conjunction with disposable cores. For the strength of the load-bearing component according to the invention made of fiber-reinforced plastic, it proves to be advantageous if the synthetic-resin-impregnated semi-finished fiber product is in the form of essentially parallel strips, wound side by side and/or one over the other.

The outer belt elements and the intermediate structure are as a rule not wound homogeneously. Instead, the component embodied according to the invention offers the capability of providing individual regions of the outer belt elements and of the trelliswork-like intermediate structure with a different number of windings for specific applications. In this way, the load-bearing component can be reinforced purposefully in individual regions to suit its later requirements, while other portions of the component are provided with intentional weakened places. The trelliswork structure can be either symmetrical or asymmetrical. In the case where it is used as a bearer in a vehicle chassis, it is thus possible to make crumple and compression zones that can be calculated quite exactly.

In a component, the outer belt elements each have one wound upper belt and one wound lower belt, which are joined together by the intermediate structure wound integrally in trelliswork-like fashion. Precisely this relatively simple, trelliswork-like embodiment of the bearer allows good calculability of its properties.

In a variant of the bearer, which has enhanced strength transversely to the longitudinal direction of the upper and lower belt as well, the upper and lower belt are joined to one another by two wound side belts. In addition to their reinforcing function, the side belts also form a covering for the intermediate structure. This prevents foreign bodies from getting into the intermediate structure and can also be desirable for aesthetic reasons. For production reasons and for the sake of better incorporation of the side belts into the overall structure, the side belts are advantageously wound integrally with the upper and lower belt and the intermediate structure. When embodied in this way, the entire load-bearing component is in the form of an integral individual body.

In a variant of the invention, the outer belt elements are disposed in a circle and form a substantially annular outer face. The wound component is for instance a wheel rim. The composite rim has sufficiently high strength. It is also markedly lighter in weight than comparable rims of conventional steel construction. Even compared to aluminum rims, the composite rim has weight advantages. The circular arrangement of the outer belt elements, which are joined to one another by an intermediate structure wound in trelliswork-like fashion, also makes it possible to produce other rotationally symmetrical components, such as carrier wheels, which are used to manufacture belts of various kinds.

In accordance with the intended application, the component can be provided with an outer skin embodied in substantially closed fashion, which prevents contaminants from penetrating into the interior of the component and being deposited there.

In an exemplary method of the invention for producing a component from a synthetic-resin-impregnated semi-finished fiber product, the semi-finished fiber product is wound on a winding core, preferably in layers, in a winding process and subsequently hardened and dried. The method is distinguished in particular in that in winding the semi-finished fiber product around an arrangement of winding spools, a number of outer belt elements are made by winding and are wound integrally with an intermediate structure that is constructed in trelliswork-like fashion. In a method of the invention, the upper and lower belt and the trelliswork-like intermediate structure of the wound component are thus wound integrally, in the same operation, from a quasi-endless semi-finished fiber product. As a result, the outer belt elements the intermediate structure connecting them are in the form of an individual element. The voids between the outer belt elements and the intermediate structure are filled at least in some regions with a filler material. The constructive design and filling of the voids enhances the overall strength of the component and makes the production process easier. Because of the integral winding operation, the component can be designed and wound very simply to suit requirements. The filler material supports the pressure-loaded portions of the trelliswork-like intermediate structure and prevents its uncontrolled buckling if the load for which they are designed is exceeded.

When the component is used as a bearer in automotive construction, the filler material can, among other things, improve energy absorption in the event of a crash and prevent uncontrolled buckling of pressure-loaded branches of the trelliswork-like intermediate structure. As the filler material, a technical plastic foam is for instance selected that can be foamed physically or chemically. Alternatively or in addition, a metal or ceramic foam can be introduced as a filler material into the interstices.

An expedient variant method for producing components from fiber-reinforced plastic with still further improved strength includes the following method steps, in particular:

the quasi-endless synthetic-resin-impregnated semi-finished fiber product is wound over winding spools, which for the purposes of the winding operation are secured detachably to a winding plate;

the wound component is disposed in a framelike closing form which is braced on the winding plate and encloses the component;

the closing form is closed with a cap, which cap is provided with closable fill openings for the filler material, in particular a physically or chemically foamable technical foam and/or a metal or ceramic foam, in order at least in some regions, as needed, to fill the interstices remaining in the component;

the wound component is heated, for instance by heating the winding core, in such a way that the filler material expands, and the component is compacted;

the wound component is unmolded and is tempered before or optionally after the unmolding.

As a result of the compacting of the component in the method sequence described, the component is optimized in terms of stoichiometry, and its strength is enhanced still further.

An exemplary method of the invention for producing fiber-reinforced components makes it possible to select the number of windings made one over the other and/or side by side and the course of the windings along the winding spools (or bobbins) disposed side by side and one after the other as a function of the forces to be absorbed by the wound component. As a result, the component can be designed specifically for the planned load. This constructive design of the component on the order of a trelliswork (e.g., a triangular braced framework) bearer makes it relatively simple to calculate features of the component and its specific design.

The winding spools can be removed from the component after the winding operation for re-use for producing other components. It can also be provided that individual winding spools, which have been embodied as inserts and equipped with connection devices, such as threaded bores, for securing additional connection components to be incorporated into the wound component in such a way that they form an integral part of the component.

To assure that the strength of the semi-finished fiber product, defined in the longitudinal direction of the fibers, in the component will come adequately into play, the semi-finished fiber product during the winding process in the trelliswork-like intermediate structure can be guided in each case over at least two winding spools, disposed side by side, of the winding core, before the longitudinal orientation of the fibers is changed by changing the winding direction.

For the strength of the load-bearing component, a parallel winding method proves advantageous, in which the semi-finished fiber product is wound in essentially parallel windings over individual winding spools. Crossings of the windings on the winding spools occur practically only in winding layers located above one another.

An exemplary method of the invention can be performed by hand, semiautomatically, or fully automatically. The method of the invention is especially suitable for CNC-track-controlled winding machines, which offer the capability of controlling and regulating the fiber position, the winding pattern, the yarn tension, the stoichiometric ratio of fibers to the synthetic resin matrix, etc., under the control of a microprocessor. In conjunction with a programmable machine computer, the load values ascertained can be converted directly into design data and used for the control and regulation of the winding machine.

As the semi-finished fiber product, in an exemplary method of the invention, carbonized natural fibers of flax, hemp or Chinese reed or carbon, aramide and/or elastic glass rovings can advantageous be used, which are primarily or only immediately before the winding operation saturated in an impregnating device with a pressure-setting or thermoplastic matrix comprising a two-component resin. The thickness of the impregnated rovings is selected as, for example, approximately 1.5 mm to approximately 4 mm, and preferably approximately 2.5 mm.

The usage of the wound load-bearing components of the invention ranges from automotive and mechanical engineering applications, building construction, and underground civil engineering work to outer-space applications. Applications exist wherever lightweight construction is necessary or desirable. As a particular field of use, automotive engineering is emphasized, in which the construction according to the invention of the components and the production method enable a simple design of components for use as crash elements in chassis construction. In the case of bearers, the component is produced with a wound upper belt and a wound lower belt, which are joined together into a unit by an integrally wound trelliswork-like intermediate structure. In an alternative variant embodiment, a number of outer belt elements is produced by winding techniques and arranged in a circle. Over the circumference of the circle, they alternate with large winding spools. The synthetic-resin-impregnated semi-finished fiber product is guided over one large winding spool each both before and after an outer belt element is wound. Between operations of winding over two large winding spools disposed on the circumference, the semi-finished fiber product is guided by one portion of the trelliswork-like intermediate structure.

FIG. 1 schematically shows a known method in the form of a fiber winding process, which can be used to produce the components of the invention from fiber-reinforced plastic. In it, a semi-finished fiber product P, kept prestressed by a tensing unit 2, is drawn from a supply spool 1 and guided through an impregnating unit 3. The impregnating unit 3 can be embodied as an immersion saturation device or, as shown as an example, as a rolling impregnating device. The various forms of impregnating units are well known to one skilled in the art and therefore require no further explanation. The semi-finished fiber product P, impregnated with a synthetic resin system in the impregnating unit 3, is then deposited, by means of a guide unit 4 that is connected to the computer-controlled winding machine, onto a winding core 5 that rotates synchronously with the guide unit 4. After that, the wound body is dried. The semi-finished fiber product includes for example directional carbon, aramide or glass fibers as individual fibers, or, depending on requirements, such fibers in arbitrary combination with one another and is in the form of a roving with a thickness of, for example, approximately 1.5 mm to approximately 4 mm, preferably 2.5 mm. Carbonized natural fibers of flax, hemp or Chinese reed can also be used. The synthetic resin is advantageously a thermoplastic or pressure-setting two-component resin.

FIG. 2 shows one example of a winding system 10, in particular a computer controlled CNC winding system. It includes a winding machine 11, a machine controller 12, and a machine computer 13. The interaction of the various components of the system is represented by the double arrows 14 and 15. The machine computer 13 serves the purpose of real-time regulation of the machine and real-time administration of the control data in the control mode. It allows programming, administration and graphic representation of the control data in the program mode. Moreover, via the machine computer, it is possible to optimize the control data, such as the rotary speed of the winding core. The machine controller 12 of the winding system 10 is responsible for regulation, control and communication. For regulating the winding sequence, and in particular the winding strip shafts, the course of the actual value over time of the axis positions is adapted continuously to a preprogrammed or previously calculated course of the set-point value. The machine controller also continuously controls or regulates other relevant process parameters, such as the yarn tension of the semi-finished fiber product. The communication function makes a data exchange possible between the winding machine 11 and the machine computer 13. The winding machine 10 can be embodied as a rotary winding machine, with a pivot axis for the winding head, a carriage that is adjustable horizontally, and a positioning shaft. The elements of the winding machine have enough degrees of freedom of motion to allow components of the desired type to be wound. For producing somewhat more-complex components, preferably six degrees of freedom of motion are provided.

FIG. 3 shows an exemplary situation for producing an exemplary component of the invention. A number of winding spools (or bobbins), numbered sequentially by reference numerals 21–30, are mounted side by side and one after the other on a winding plate 20. The winding plate 20 forms one part of the winding core 5 (FIG. 1). The winding spools 21–30 can be of metal or plastic. The impregnated semi-finished fiber product P, drawn as a roving from the supply spool, is deposited in a predetermined winding plan onto the winding spools 21–30. The winding plan is oriented to the control data stored in memory in the machine computer, which have been ascertained as a function of the expected load on the component to be produced. Such a winding plan can be defined for instance by specifying the winding spools to be approached in succession. For instance, such a winding plan could have the following course: S; 21; 23; 26; 28; 29; 30; 29; 30; 28; 25; 23; 22; 21; 22; 21; 24; 26; 27; 29; 30; 27; 25; 24; 22; 21; 23; 25; 27; 29; 30; 28; 26; 24; 22; 21; etc.; E. In this sequence, S stands for the start of the rovings P deposited, the reference numerals indicate the winding spools in succession in the winding direction, and E represents the end of the rovings P. The suggested winding plan is intended merely to explain the winding sequence and is therefore not a compulsory scheme. On the contrary, a new winding plan can be defined for each component geometry to be set up. It should be remembered that for the highest possible loading capacity, the roving should be guided directionally for as long as possible before the winding direction and thus the direction of the fibers is changed.

FIG. 4 shows the design of an exemplary apparatus for another advantageous method step in producing a load-bearing component of the invention from fiber reinforced plastic. The fully wound component is identified overall by reference numeral 40. The illustration indicates that some of the winding spools 21–30 can be embodied as disposable parts. They stay behind in the wound component and form an integral part of it. For instance, they can be embodied as inserts 21, 22, 29, 30, which are equipped with threaded bores 35 for connecting further structural elements to the component 40. The other winding spools 23–28 can be removable from the component 40 so that they can be re-used to produce further wound components. The completely wound component 40 in FIG. 4 is still disposed on the winding plate 20. For the next method step, it is surrounded by a framelike closing form 31, whose inner contour is adapted to the shape of the component. The closing form 31 is braced on the winding plate 20 and can be closed by a cap 32. The cap is provided with bores and closable fill openings 33, through which a filler material can be introduced into the voids that remain in the wound component 40. As the filler material, a physically or chemically foamable technical plastic or a metal or ceramic foam can be used. As a result of the expansion of the filler material during the drying of the component 40 in the closed closing form 31, compacting of the winding occurs. This increases the strength of the wound component 40 still further. After the compacting, the component 40 is tempered either in the closing form or after being unmolded.

FIG. 5 shows an exemplary embodiment of a completely wound, unmolded component 40. The component includes an upper belt 41 and a lower belt 42, which are integrally joined to one another by an intermediate structure 43 of trelliswork-like construction. On each of its long ends, the component 40 has a respective side belt 44, 45, which is likewise integrally wound with the upper and lower belts 41, 42 and the trelliswork-like intermediate structure 43. The inserts 21, 22 on the one hand and 29, 30, each equipped with threaded bores 35 for connecting additional structural elements, are incorporated into the respective side belts 44, 45. The foamed filler material that fills the interstices between the upper and lower belts 42, 42 and the intermediate structure 43 is identified by reference numeral 46. For the sake of clarity, the foamed filler bodies 46 are shown inserted at various distances. The wall thicknesses of the upper and lower belts 41, 42 of the side belts 44, 45 and the wall thickness of the trelliswork-like intermediate structure 43 can be variable, depending on the expected load on the component, in some regions in accordance with the calculated design. This can be achieved by means of a variable winding density. As a result, the component of fiber-reinforced plastic can be custom-tailored to its later use. For instance, weakened regions can be incorporated intentionally, to provide a crumple zone for use of the component in a vehicle chassis. As a covering to protect against soiling, the component 40 can also be provided with an outer skin, such as a sprayed-on plastic skin. To assure use under extremely adverse environmental factors of physical or chemical origin, the wound bearing structure can be spraycoated in the conventional way. In this way, both surface protection and class-A surface quality can be combined in the most simple manner.

The wound component suggested in FIG. 6 is constructed essentially rotationally symmetrically and is identified overall by reference numeral 50. The illustration shows a profile disposed annularly, in which large winding spools 57–61 disposed on the circumference alternate with outer belt elements 62–66. The outer belt elements 62–66 can be wound onto outer form parts curved in the manner of a segment of a circle. The trelliswork-like intermediate structure has winding spools 51–56. The winding sequence can have the following course, for example: From the winding spool 51 located in the center, the semi-finished fiber product P, for instance an impregnated fabric band, is guided to the winding spool 52 and from there to the large winding spool 57 located on the circumference. The large winding spool 57 can be wound onto before the fabric band P is carried to the curved outer form part, in the form of a segment of a circle, for forming the outer belt element 62, then wound around the latter and carried to the next large winding spool 61. After the large winding spool 61, the fabric band P is guided back into the trelliswork-like intermediate structure, where it is initially guided unidirectionally over the winding spools 56 and 51, before its winding direction is changed to the direction onto the winding spool 54. From the winding spool 54, the fabric band P reaches the large winding spool 59 disposed on the circumference. This spool can be rounded (that is, encircled) at least once before the fabric band P is carried onto the outer form part for the outer belt element 64. After the outer belt element 64, the fabric band P is guided around the adjacent large winding spool 58 before being carried again to the winding spools in the trelliswork-like intermediate structure, and so forth. In this way, it is assured that the fabric band is also guided alternatingly over one portion of the circumference and over the intermediate structure. On the circumference, the fabric band P can be guided over two large winding spools and one outer belt element disposed between them. In the intermediate structure, the fabric band can be guided first over two adjacent winding spools before its winding direction changes. To summarize, the resultant winding sequence, for example, is as follows: 51-52-57; 62-61-56-51-54-59-64-58; 53-51-56-61-63-60-55-51-53-58-66-57-52-51-55-60-64-59-54-51- etc. Besides rovings with directional fibers, woven, braided, knitted or otherwise cross-linked yarns, as well as nonwoven bands, can be used as the fabric band.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for producing a load-bearing wound component from a synthetic-resin-impregnated semi-finished fiber product (P) in a winding process, comprising:
    winding outer belt elements of said component and an intermediate structure embodied in a trelliswork-like fashion integrally from the fiber product in a continuous winding process, the outer belt elements being wound in at least one of one over the other and side-by-side parallel-extending windings over winding spools having axes which extend essentially parallel to each other in order to obtain essentially planar outer belt elements; and
    filling voids between the outer belt elements and the intermediate structure in only some regions with a filler material, leaving other regions void of the filler material, said wound component being cured to harden, and dried.

2. The method of claim 1, wherein interstices between the outer belt elements and the intermediate structure are filled at least in some regions with a foamed filler material.

3. The method of claim 2, comprising:
- winding the synthetic-resin-impregnated semi-finished fiber product (P) over winding spools, which for purposes of the winding operation are secured detachably to a winding plate to produce a wound component;
- disposing the wound component in a framelike closing form which is braced on the winding plate and encloses the component;
- closing the closing form with a cap, the cap being provided with closable fill openings for foam filler material to, at least in some regions, fill interstices remaining in the component;
- heating the wound component by heating the winding core such that the filler material expands, and the component is compacted before being unmolded; and
- tempering the wound component in a tempering device.

4. The method of claim 1, wherein the number of windings made one over the other and/or side by side, and a course of the windings along winding spools disposed side by side and one after the other, are selected as a function of forces to be absorbed by the wound component.

5. The method of claim 1, wherein individual winding spools are selected as inserts, which are equipped with connection devices, for securing further connection components.

6. The method of claim 3, wherein the semi-finished fiber product (P) in the intermediate structure is guided in each case over at least two winding spools, disposed side by side, of the winding core, before a longitudinal orientation of the fibers is changed by changing a winding direction.

7. The method of claim 1, wherein the semi-finished fiber product (P) is wound in essentially parallel-extending windings over a winding spool.

8. The method of claim 1, wherein the winding process is performed in automated fashion.

9. The method of claim 1, wherein as the semi-finished fiber product includes carbonized natural fibers of flax, hemp or Chinese reed or carbon, aramide and/or elastic glass rovings, saturated with a pressure-setting or thermoplastic matrix of a two-component resin in a thickness of approximately 1.5 mm to approximately 4 mm.

10. The method of one claim 1, wherein one upper belt and one lower belt are made and wound by winding technology integrally with the intermediate structure constructed in trelliswork-like fashion.

11. The method of claim 1, comprising:
- using technology to produce a number of outer belt elements which are disposed in a circle and disposed in alternation along a circumference of a circle with large winding spools, and the synthetic-resin-impregnated semi-finished fiber product (P), before and after the winding of an outer belt element, is guided in each case over a large winding spool, and between the winding operation, in each case one portion of the trelliswork-like intermediate structure is wound over two large winding spools disposed on the circumference.

* * * * *